United States Patent
Jensen (10) Patent No.: US 6,854,724 B2
(45) Date of Patent: Feb. 15, 2005

(54) PNEUMATIC SHEET TRANSPORTATION

(75) Inventor: David William Jensen, Balmain (AU)

(73) Assignee: Silverbrook Research PTY LTD, Balmain (AU)

(*) Notice: Subject to any disclaimer, the term of this patent is extended or adjusted under 35 U.S.C. 154(b) by 18 days.

(21) Appl. No.: 10/636,191

(22) Filed: Aug. 8, 2003

(65) Prior Publication Data

US 2004/0041327 A1 Mar. 4, 2004

Related U.S. Application Data

(62) Division of application No. 10/052,425, filed on Jan. 23, 2002, now Pat. No. 6,619,654.

(30) Foreign Application Priority Data

Feb. 7, 2001 (AU) .............................................. PR2925

(51) Int. Cl.[7] .................................................. B65H 3/14
(52) U.S. Cl. .............................. 271/98; 271/97; 271/93; 271/90; 271/94; 271/108
(58) Field of Search ............................... 271/98, 97, 93, 271/90, 94, 108

(56) References Cited

U.S. PATENT DOCUMENTS

| | | | | |
|---|---|---|---|---|
| 3,130,602 A | * | 4/1964 | Nigrelli et al. ................ | 74/593 |
| 3,558,126 A | | 1/1971 | Jiruse | |
| 4,089,518 A | * | 5/1978 | Vollrath ...................... | 271/167 |
| 4,496,143 A | | 1/1985 | Weyer | |
| 4,579,330 A | | 4/1986 | Lehmann | |
| 4,669,716 A | * | 6/1987 | VanderSyde et al. ......... | 271/98 |
| 4,887,805 A | | 12/1989 | Herbert et al. | |
| 5,058,876 A | | 10/1991 | Grossmann | |
| 5,098,077 A | | 3/1992 | Russel | |
| 5,110,110 A | | 5/1992 | Wirz et al. | |
| 5,184,813 A | * | 2/1993 | Schwitzky et al. ........... | 271/98 |
| 5,836,582 A | | 11/1998 | Ogawa et al. | |
| 5,876,031 A | * | 3/1999 | Ohkoda et al. ............... | 271/14 |
| 6,398,206 B1 | | 6/2002 | Yang et al. | |
| 6,398,207 B1 | | 6/2002 | Taylor et al. | |
| 6,398,208 B1 | | 6/2002 | Yang et al. | |
| 6,502,815 B1 | * | 1/2003 | Baureis et al. ................ | 271/11 |
| 6,568,670 B2 | * | 5/2003 | Jensen .......................... | 271/98 |
| 6,619,654 B2 | * | 9/2003 | Jensen .......................... | 271/98 |
| 6,648,321 B2 | * | 11/2003 | Jensen .......................... | 271/98 |
| 6,659,447 B2 | * | 12/2003 | Jensen .......................... | 271/98 |

FOREIGN PATENT DOCUMENTS

| | | |
|---|---|---|
| DE | 4227814 A1 | 2/1993 |
| EP | 741098 A2 | 11/1996 |
| SU | 1680606 | 9/1991 |
| WO | WO 02 062685 | 8/2002 |

* cited by examiner

Primary Examiner—Donald P. Walsh
Assistant Examiner—Matthew J. Kohner (57) ABSTRACT

A method of separating a sheet of print media from a stack of sheets, the sheets being porous, includes blowing fluid on to a top surface of a topmost sheet of the print media on the stack so that the fluid passes through at least the topmost sheet of the stack and capturing at least a part of the topmost sheet for conveyance to a printing station of a printer.

5 Claims, 7 Drawing Sheets

PNEUMATIC SHEET TRANSPORTATION

Divisional application of U.S. Ser. No. 10/052,425 filed on Jan. 23, 2002 now U.S. Pat. No. 6,619,654.

FIELD OF THE INVENTION

This invention relates to a high speed, photographic quality printer. More particularly, the invention relates to a method of separating a sheet of print media from a stack of sheets, the sheets being porous.

BACKGROUND TO THE INVENTION

The applicant has developed various printheads which provide high speed, photographic quality printing. The printheads comprise ink jet nozzles arranged in an array. The ink jet nozzles are formed using microelectromechanical systems (MEMS) technology. The use of MEMS technology results in very high speed printing capabilities where pages can be printed at a rate of up to two pages per second (for double-sided printing).

To facilitate such high speed printing, it is important, firstly, that the paper fed to the printing station of the printer is accurately aligned and capable of the required feed rate with as little likelihood as possible of paper jams or the like, occurring. Secondly, the paper must be able to be fed to the printing station at a rate sufficient to use the high speed printing capabilities of the printing station to its fullest extent.

SUMMARY OF THE INVENTION

According to the invention, there is provided a method of separating a sheet of print media from a stack of sheets, the sheets being porous and the method including the steps of:

blowing fluid on to a top surface of a topmost sheet of the print media on the stack so that the fluid passes through at least the topmost sheet of the stack; and capturing at least a part of the topmost sheet for conveyance to a printing station of a printer.

The method may include blowing the fluid on to the top surface of the topmost sheet through an aperture means of a pick up means of a print media feed arrangement. The pick up means may be in the form of a pick up bar. The aperture means of the pick up bar may be in any of a number of different forms. For example, the aperture means may be in the form of a channel extending longitudinally along the bar. Instead, the bar may support a plurality of longitudinally spaced, discrete orifices, the orifices defining the aperture means.

The method may include, initially, prior to capturing said at least part of the topmost sheet, lifting said at least part of the topmost sheet from the stack. The method may include causing said lifting of said at least a part of the topmost sheet by creating a low pressure region between a face of the pick up means and the top surface of the topmost sheet of print media.

Preferably, the method includes maintaining the pick up means in spaced relationship relative to the top surface of the topmost sheet of print media to cause said low pressure region.

The method may include capturing said at least part of the topmost sheet of print media by the pick up means, preferably by reversing a direction of fluid flow through the pick up means to cause a change from a blowing action to a suction action.

The method may include conveying said topmost sheet of print media in a direction substantially normal to a direction of flow of fluid blown on to the stack.

BRIEF DESCRIPTION OF THE DRAWINGS

The invention is now described by way of example with reference to the accompanying drawings in which.

DETAILED DESCRIPTION OF THE DRAWINGS

Figure 1:
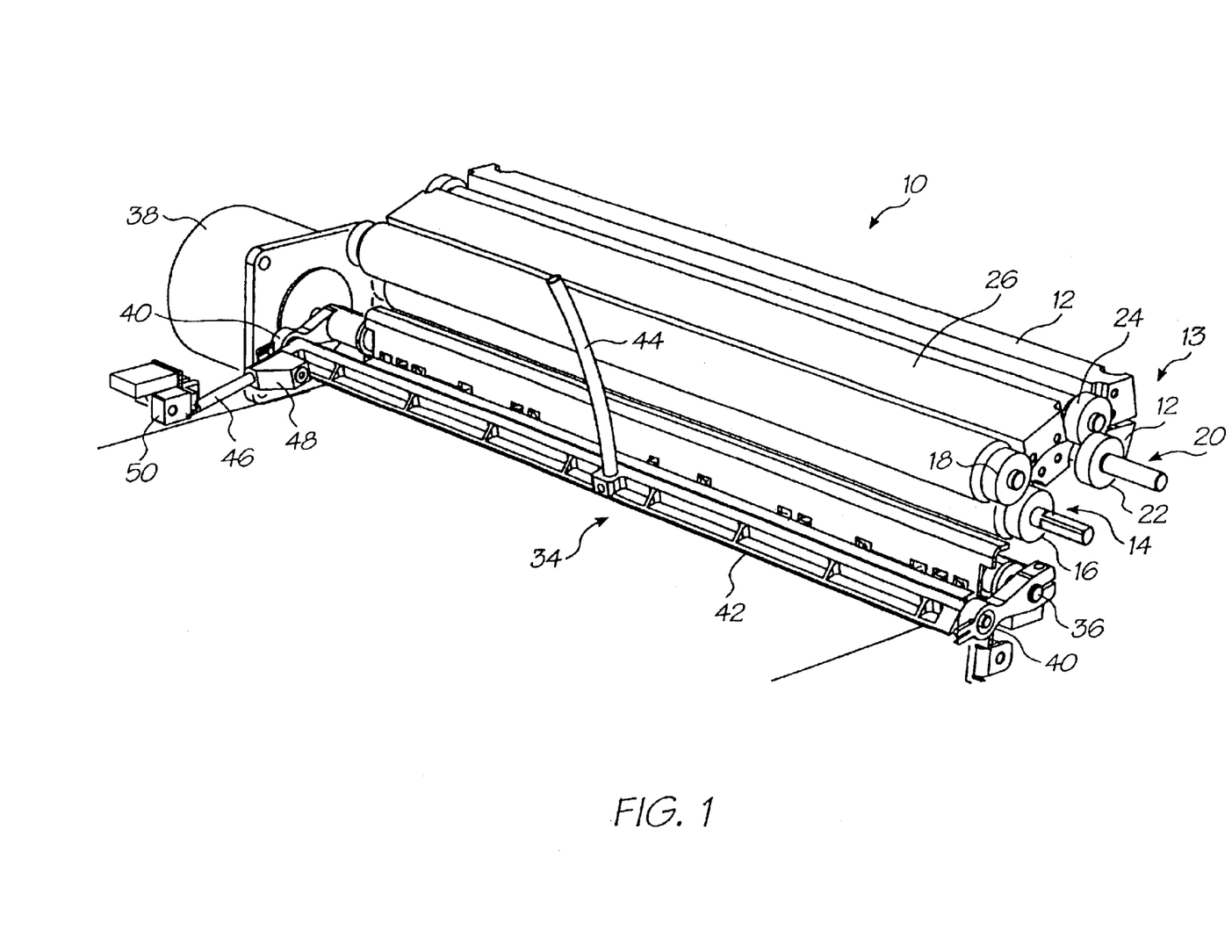
FIG. 1 shows a part of a printer including a print media feed arrangement operated in accordance with the method of the invention.

Referring initially to FIG. 1 of the drawings, a part of a printer is illustrated and is designated generally by the reference numeral 10. The printer 10 is a high speed printer which prints both sides of print media at the rate of approximately one sheet per second or two pages per second (i.e. both sides of the sheet). The print media is, in this case, in the form of a stack of sheets. For ease of explanation, the invention will be described with reference to the print media being a stack of A4 sheets of paper and, more particularly, sheets of paper having a predetermined degree of porosity.

The printer 10 uses a pair of opposed page width printheads 12, arranged at a printing station 13, to print on both sides of sheets of paper fed through the printing station 13. Each printhead 12 is in the form of a microelectromechanical systems (MEMS) chip having an array of ink jet nozzles to achieve the high speed, photographic quality printing desired.

The printing station 13 includes a set of primary rollers 14, comprising a drive roller 16 and a driven roller 18, arranged upstream of the printheads 12 to convey a sheet of paper to the printheads 12,. A secondary set of rollers 20, comprising a first roller 22 and a second roller 24, is arranged intermediate the printheads 12 and the set of primary rollers 14. A paper deflector 26 is arranged between the sets of rollers 14 and 20.

Figure 2:
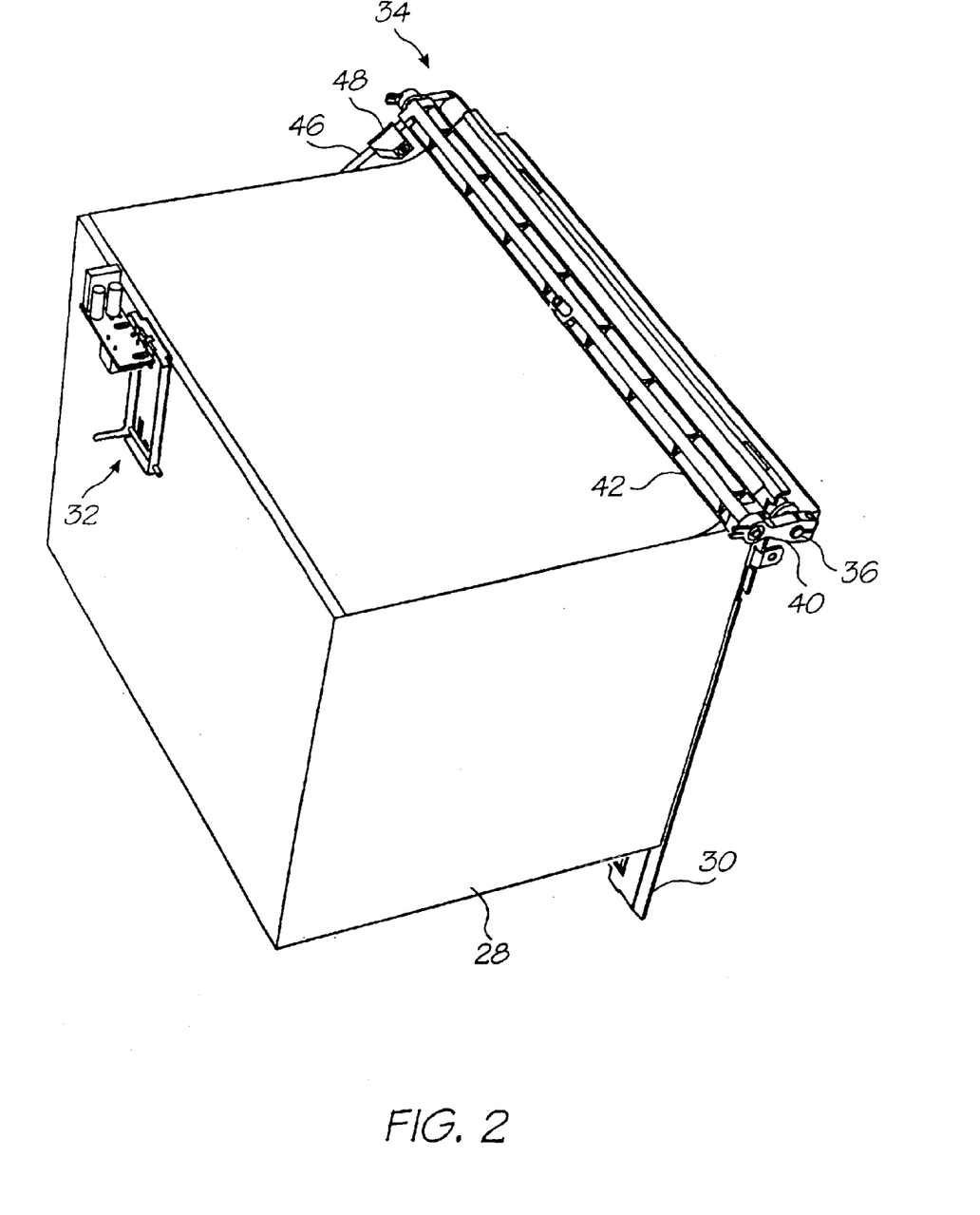
FIG. 2 shows a three-dimensional view of an input region of the printer including part of the print media feed arrangement.

As illustrated more clearly in FIG. 2 of the drawings, the print media is, as described above, arranged in a stack 28. The stack 28 is received in a bin (not shown) of the printer 10 and is retained against a metal bulkhead 30 of the printer 10 in a suitable cabinet (also not shown). A tapping mechanism 32, which is solenoid driven, taps the paper stack 28 to ensure that the sheets of the paper stack 28 are maintained in accurate abutment with the metal bulkhead 30 so that, when a sheet is fed is to the printing station 13, as will be described in greater detail below, the sheet lifted from the stack 28 is aligned to be in register with the printheads 12. In other words, the tapping mechanism 32 inhibits skewing of a sheet picked from the stack 28.

The printer 10 includes a paper feed arrangement 34 for feeding a sheet of paper from the stack 28 to the rollers 16 and 18 of the set of primary rollers 14 so that the sheet of paper can be transported to the printing station 13 for printing.

Figure 3:
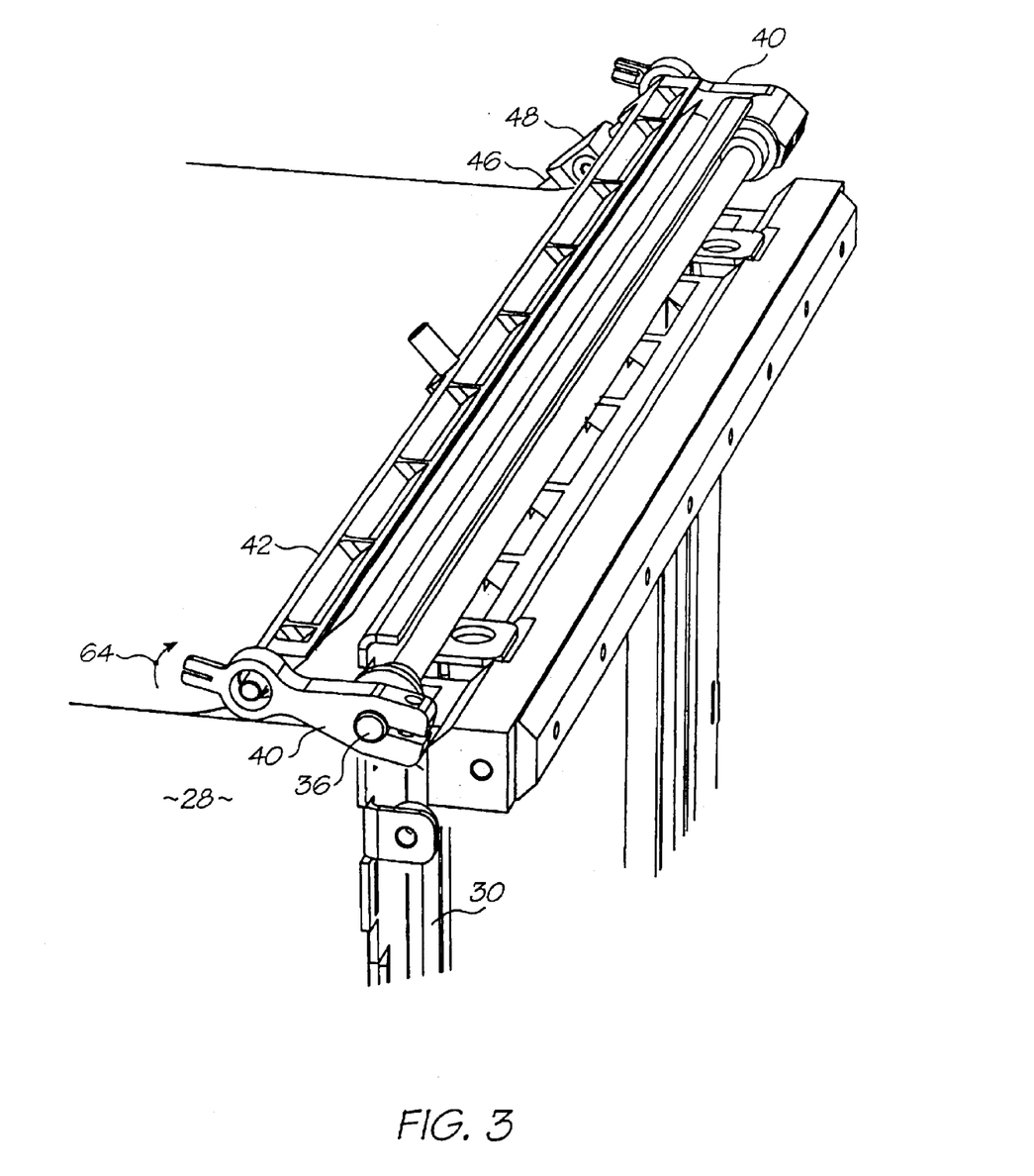
FIG. 3 shows a three dimensional view, on an enlarged scale, of the part of the print media feed arrangement of FIG. 2.

The feed arrangement 34 comprises a pivot rod or axle 36 which is rotatably driven by a drive means in the form of a stepper motor 38. A swing arm 40 is arranged at each end of the axle 36.

The paper feed arrangement 34 includes a pick up bar 42 which is connected to a fluid hose 44. The pick up bar 42 is pivotally attached to the swing arms 40. An arm 46, having a bifurcated end (not shown) projects from one end of the bar 42. The arm 46 is slidably received in a sleeve in the form of a pivot block 48. The arm 46 and, more particularly, its bifurcated end, cooperates with an optical sensor 50 to determine when the pick up bar 42 is in its home position, the home position of the pick up bar 42 being shown, schematically, in FIG. 4 of the drawings.

Figure 4:
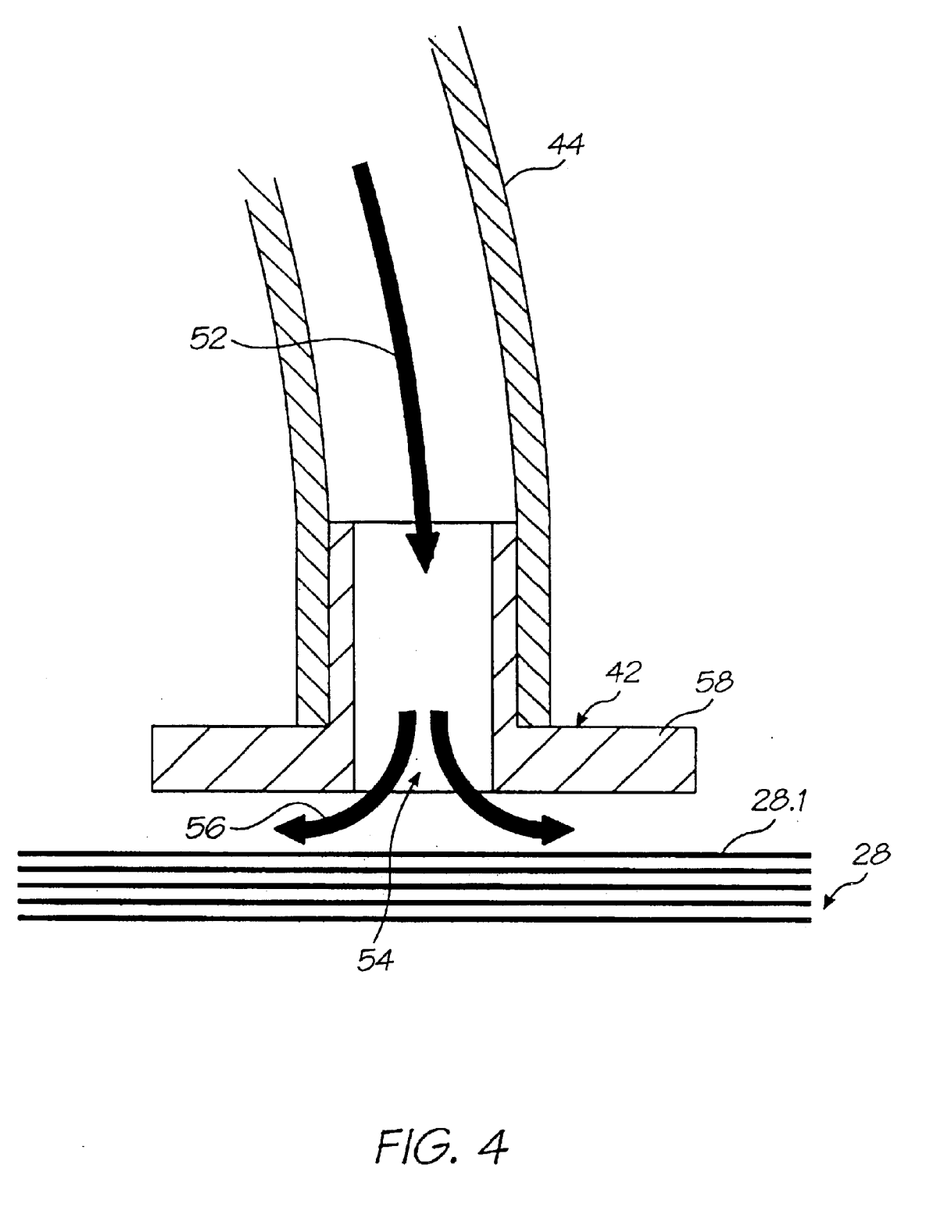
FIG. 4 shows a schematic, sectional side view of an initial stage of operation of the print media feed arrangement.

As described above, the printer 10 is a high-speed printer which has a capacity to print at the rate of one sheet per second. To make use of this capability, it is important that the sheets of paper are fed individually to the printing station 13 from the stack 28 in an accurate, controlled manner. Consequently, it is necessary for the pick up bar assembly 34 to separate a sheet to be transported to the printing station 13 from the stack 28 accurately. To separate a topmost sheet 28.1 from the stack 28, the fluid hose 44 is connected to a fluid source (not shown). Air is blown down the hose 44 in the direction of arrow 52 as shown in FIG. 4 of the drawings. The air exits through an outlet aperture 54 of the pick up bar 42 as shown by the arrows 56. The air is forced between a foot portion 58 of the pick up bar 42 and the topmost sheet 28.1 of the paper stack 28.

The invention is intended particularly for use with print media which is porous such as, for example, 80 gsm paper.

Figure 5:
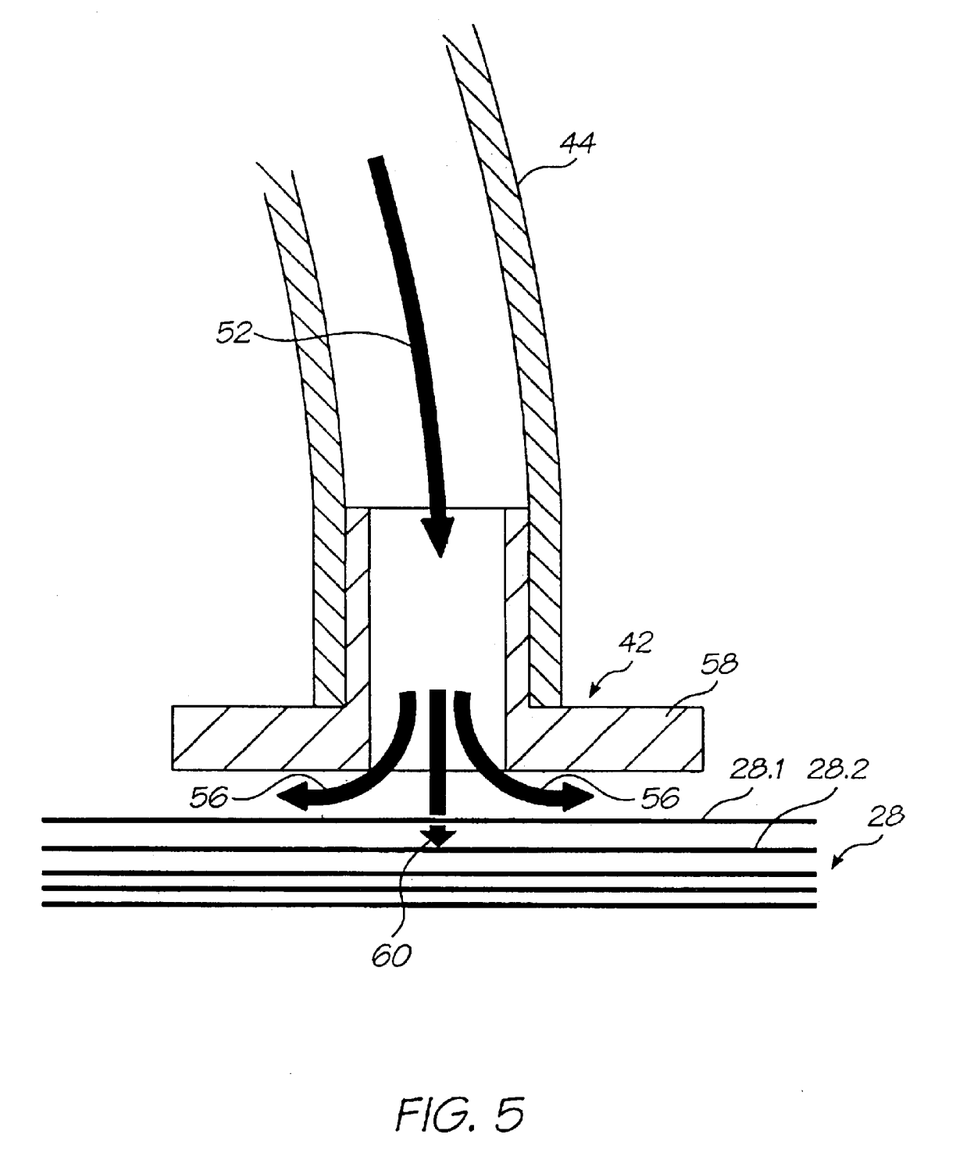
FIG. 5 shows a schematic, sectional side view of a second stage of operation of the print media feed arrangement.

Due to the porosity of the paper, air is also driven through the topmost sheet 28.1 and impinges on a sheet of the stack 28 which is second from the top, as shown by arrow 60 in FIG. 5 of the drawings. This results in an initial separation of the topmost sheet 28.1 from the remainder of the sheets of the stack 28.

Figure 6:
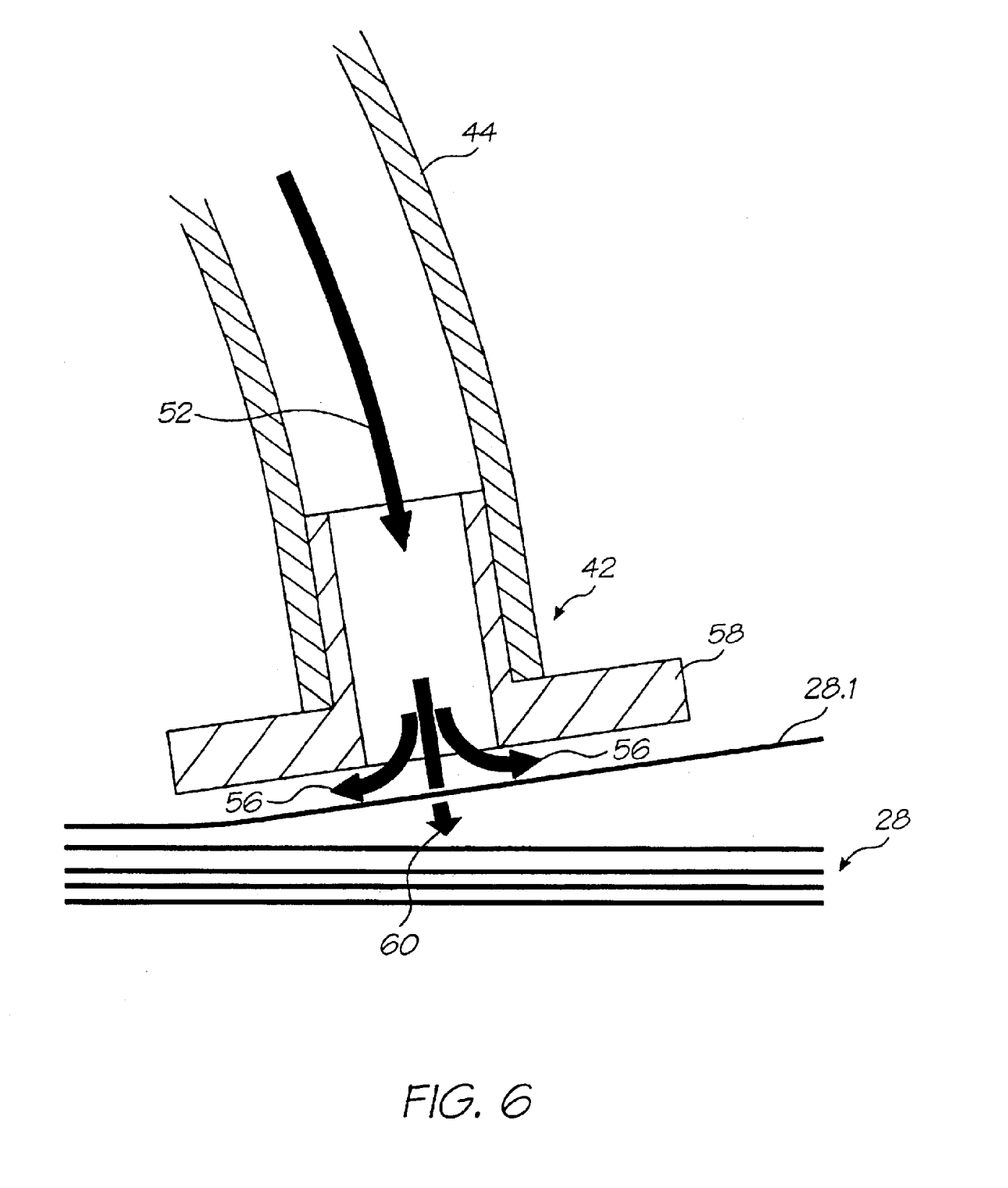
FIG. 6 shows a schematic, sectional side view of a third stage of operation of the print media feed arrangement.

Also, as a result of localised low pressure occurring between a periphery of the foot portion 58 of the pick up bar 42 and the topmost sheet 28.1 of the stack 28, the topmost sheet 28.1 is attracted to the pick up bar 42 as shown in FIG. 6 of the drawings. Due to the passage of air through the topmost sheet 28.1 separation of the topmost sheet 28.1 from the remainder of the sheets of the paper stack 28 is aided.

Figure 7:
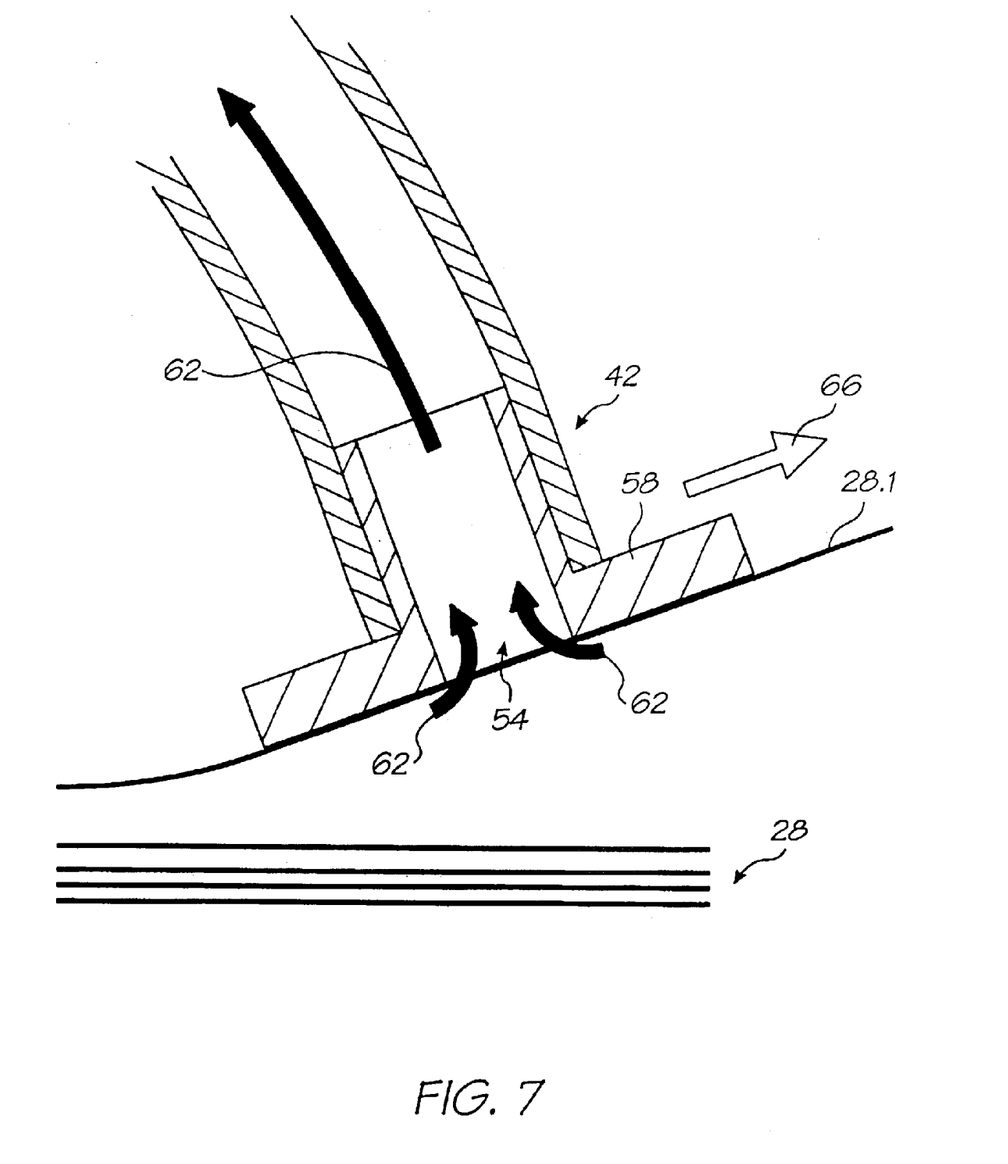
FIG. 7 shows a schematic, sectional side view of a fourth stage of operation of the print media feed arrangement.

Once the sheet 28.1 has been lifted off the stack 28 and transported a short distance from the stack 28 and when the pick up bar 42 reaches a predetermined altitude relative to the stack 28, the direction of flow of the air is reversed so that a suction effect is imparted at the aperture 54 of the pick up bar 42. This is shown in FIG. 7 of the drawings by arrows 62.

As the swing arms 40 of the paper feed arrangement 34 continue to rotate in the direction of arrow 64 (FIG. 3 of the drawings), the pick up arm 42 moves in the direction of arrow 66 (FIG. 7) so that a leading edge of the topmost sheet 28.1 of the paper stack 28 is fed between the rollers 16 and 18 of the set of primary drive rollers 14. The suction is then shut off in the hose 44 so that the sheet 28.1 is released from the pick up bar 42 for onward conveyance by the sets of rollers 14 and 20 to the printing station 13 for printing purposes.

It will be appreciated that the airflow parallel to a surface of the topmost sheet 28.1 of the stack 28 results in a low friction cushion which facilitates translational motion of the sheet 28.1 relative to the pick up bar 42. This allows the sheet 28.1 to be moved by any suitable method in a direction normal to a face of the pick up bar 42 without hindering the picking action of the pick up bar 42. It also facilitates maintaining a trailing portion of the sheet 28.1 in spaced relationship relative to the stack 28 while the sheet 28.1 is being fed to the set of rollers 14.

The applicant has found that the velocity of air through the fluid hose in the initial, "blowing" direction is not critical, nor is the spacing between the pick up bar 42 and the topmost sheet 28.1 of the paper stack 28. Further, the weight or grade of the paper of the stack is also not critical provided that the paper in the stack has a degree of porosity.

Typically, a pressure of approximately 5 kPa is present in the fluid hose 14 when the air is blown on to the paper stack 28. The air is delivered at approximately 1 l/s and exits the gap between the foot portion 58 of the pick up arm 42 and the topmost sheet 28.1 at a pressure of approximately 1 kPa at a velocity of approximately 50 m/s. Experimentally, the pick up arm 42 has been held at a spacing of between 0.1 mm and 0.2 mm above the paper stack 28 to pick up the topmost sheet 28.1 and this has been found to be successful. In addition, the paper feed arrangement 34 has been found to operate with paper of a grade from 40 gsm to high resolution, photo-quality ink jet paper.

The aperture 54 of the pick up bar 42 can also be any suitable shape. For example, the aperture 54 could be in the form of a straight or wavy channel extending the length of the pick up bar 42. Instead, the aperture could comprise a plurality of discrete nozzles arranged at spaced intervals along the length of the pick up bar 42.

The applicant has found that, surprisingly, by blowing air on to the paper of the stack 28 separation of the sheets is facilitated. This is an entirely counter-intuitive approach as one would expect that a suction-type mechanism would operate better. However, provided the paper of the stack 28 is porous, very good separation of the topmost sheet of paper from the stack 28 can be affected.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

What is claimed is:

1. An apparatus for separating a sheet of porous material from a stack of said sheets, comprising:
    a receptacle to hold sheet material in a stack;
    a pick up mechanism;
    a gaseous pathway having an opening into said pick up mechanism; and
    control mechanism to firstly supply a gaseous flow through said flow pathway onto the uppermost sheet of said stack, so as to penetrate said porous sheet and separate said sheet from the stack, and to secondly reverse the flow of air through the said flow pathway to hold said uppermost sheet against the said pick up mechanism, and to then move said pick up mechanism to move said captured sheet to a feeder mechanism.

2. The sheet separating apparatus according to claim 1, wherein the pick up mechanism comprises a swing arm contact member, which pivots to move said captured uppermost sheet to said feeder mechanism.

3. The sheet separating mechanism according to claim 2 wherein a pressure of approximately 5 kPa is present in the flow pathway when air is blown on to the uppermost sheet of the stack.

4. The sheet separating mechanism according to claim 3, wherein the air is delivered at approximately 1 l/s and exits the gap between the swing arm and the topmost sheet at a pressure of approximately 1 kPa at a velocity of approximately 50 m/s.

5. The sheet separating mechanism according to claim 4, wherein the swing arm is held at a spacing of between 0.1 mm and 0.2 mm above the uppermost sheet of said stack.

* * * * *